US007155910B2

(12) United States Patent
Last

(10) Patent No.: US 7,155,910 B2
(45) Date of Patent: Jan. 2, 2007

(54) DUAL, COUPLED CHECK VALVE FOR DIRECT DRIVE, REVERSIBLE POWER SOURCES FOR HYDRAULIC SYSTEMS

(76) Inventor: Harry J. Last, 1010 Koohoo Pl., Kailua, HI (US) 94734

( * ) Notice: Subject to any disclaimer, the term of this patent is extended or adjusted under 35 U.S.C. 154(b) by 0 days.

(21) Appl. No.: 10/538,734

(22) PCT Filed: Mar. 18, 2004

(86) PCT No.: PCT/US2004/008638

§ 371 (c)(1),
(2), (4) Date: May 23, 2005

(87) PCT Pub. No.: WO2004/083645

PCT Pub. Date: Sep. 30, 2004

(65) Prior Publication Data

US 2006/0070377 A1 Apr. 6, 2006

Related U.S. Application Data

(60) Provisional application No. 60/455,999, filed on Mar. 18, 2003.

(51) Int. Cl.
*F16D 31/02* (2006.01)
*E04H 4/10* (2006.01)

(52) U.S. Cl. ............................................ 60/476; 4/502

(58) Field of Classification Search .................. 60/473, 60/476, 486; 4/502
See application file for complete search history.

(56) References Cited

U.S. PATENT DOCUMENTS

| | | | | |
|---|---|---|---|---|
| 2,657,533 | A * | 11/1953 | Oster et al. | 60/476 |
| 4,565,334 | A * | 1/1986 | Ruhl | 242/413.3 |
| 5,184,357 | A | 2/1993 | Last | |
| 5,327,590 | A * | 7/1994 | Last | 4/502 |
| 5,546,751 | A | 8/1996 | Last | |
| 6,470,678 | B1 * | 10/2002 | Huber | 60/476 |
| 6,751,953 | B1 * | 6/2004 | Mentink et al. | 60/476 |

* cited by examiner

*Primary Examiner*—Thomas E. Lazo

(74) *Attorney, Agent, or Firm*—David E Newhouse

(57) ABSTRACT

An invented dual, coupled check valve mechanism is described for a direct drive, reversible hydraulic power source for hydraulic circuits that includes a manifold hydraulically coupled to the respective input/output ports and a reservoir of the hydraulic power source defining a translation passageway having mid-passage drain hydraulically coupled to the reservoir, where each end of the translation passageway has an angled annular valve seat opening to larger diameter plenum containing a check valve ball. A translating rod with a length greater and a circumferential diameter less than that of the translation passageway located in the translation passageway prevents the respective check valve balls from simultaneously seating on the valve seats at the respective ends of the translation passage way.

3 Claims, 4 Drawing Sheets

DUAL, COUPLED CHECK VALVE FOR DIRECT DRIVE, REVERSIBLE POWER SOURCES FOR HYDRAULIC SYSTEMS

RELATED APPLICATIONS

This Application relates to U.S. Provisional Patent Application Ser. No. 60/455,999 filed Mar. 18, 2003 entitled FLOW CONTROL APPARATUS FOR USE WITH FLOW DIRECTION REVERSING PUMPS IN A HYDRAULIC SYSTEM, which is incorporated herein by reference in its entirety, and claims any and all benefits to which it is entitled thereby.

BACKGROUND OF THE INVENTION

1. Field of the Invention

The invention relates to an inherent control mechanism for direct drive reversible hydraulic pumps supplying power to hydraulic circuits performing work, and in particular, a dual, coupled check valve for eliminating the necessity for pressure relief valves for resolving excess flow in a discharge leg of any hydraulic circuit such as coupled dual motor, reversible hydraulic drive systems, powered by a direct drive, reversible hydraulic power source.

2. Description of the Prior Art

In U.S. Pat. Nos. 5,184,357, 5,327,590, and 5,546,751 Applicant, Harry J. Last describes dual motor, reversible hydraulic drive systems in combination with a reversible source of hydraulic power for covering and uncovering swimming pools with flexible sheets of fabric as safety covers. One of the hydraulic motors is coupled to a cover drum for retracting, winding the cover around the cover drum. The other hydraulic motor is coupled to a cable reel for winding up cable attached to the front of the cover for extending the cover across the swimming pool. While these invented systems perform quite satisfactorily using conventional remote reversible hydraulic power packs and/or remote unidirectional hydraulic pump in a combination where a solenoid valve is utilized for reversing the direction of liquid flow to the dual motor drive system, excess discharge problems arise when simpler direct drive, reversible hydraulic power packs/pumps are chosen as the source of hydraulic power.

For example, a typical hydraulic gear-type pump schematically illustrated in FIG. 1, in cross section, can be used as a single direction unit in combination with a three position solenoid valve means for reverse direction of liquid flow. The disadvantage of such systems is the necessity for the three position solenoid valve which directs hydraulic flow in a first direction in the particular hydraulic at position one, recycles hydraulic liquid to the pump input port at position two, and directs hydraulic flow in a opposite direction in the particular hydraulic at position three. Such solenoid valves typically electrically fail due to wear and environmental conditions.

Alternatively, rotation of the intermeshing gears in the typical hydraulic gear-type pump can be reversed for reversing the direction of liquid flow in a connected hydraulic circuit. In particular, if gear 13(*a*) is rotated counterclockwise, gear 13(*b*) rotates clockwise, and pumping hydraulic liquid from port 15, around the periphery of the housing and the gear teeth and out port 14. Similarly if gear 13*b* is rotated counter clockwise hydraulic, gear 13 a rotates clockwise pumping liquid from port 14 out port 15.

In particular, with reference to FIG. 2, a typical hydraulic circuit is schematically illustrated that incorporates a direct drive, reversible hydraulic pump 16 for extending and retracting a typical hydraulic cylinder typically that includes:

(i) a hydraulic cylinder HC where the volume on the rod side leg of the circuit 30 per unit cylinder length is less than the volume per unit cylinder length on the blind side leg 31 of the hydraulic circuit (because of the rod);

(ii) a reversible pump 16 with inlet/output ports 16*a* & 16*b* forming a hydraulic circuit with the rod side leg 30 and blind side leg 31 of the hydraulic cylinder HC;

(iii) check valves 8 & 9 hydraulically coupling the respective input/output ports 16*a* & 16*b* of the reversible pump 16 to the hydraulic liquid reservoir;

(iv) pressure relief valves 11 &12 relieving pressure above a set point on the blind side leg 31 and rod side leg 30 of the of hydraulic circuit.

Because, the volume per unit length of the rod side leg 30 is less than the volume per unit cylinder length of the blind side leg 31 of the hydraulic circuit, when the system circulates liquid for the translating piston into the blind side leg 31 of hydraulic cylinder HC (indicated by arrow A), for each unit volume V of liquid pumped (output) into the rod side leg 31, that unit volume V plus increment volume ΔV is output into the blind side leg 30 of the hydraulic circuit.

Since the hydraulic circuits typically are maintained liquid full by check valves such as 8 & 9, as the piston translates into the blind side leg 31 of the hydraulic circuit check valve 8 immediately closes, and pressure increases. The reversible motor 16 continues to pump seeing the increase in liquid pressure load due to the incremental increases in volume output ΔV into the blind side of the hydraulic circuit both at its input/output port 16*b* on the rod side leg of the hydraulic circuit and at its input/output port 16*a* on the blind side leg. If the reversible pump 16 is lossy allowing flow through from the blind side leg to the rod side leg of the hydraulic circuit, pressure relief valve 12 will ultimately release stopping translation of the piston. If the reversible pump is not lossy, pressure relief valve 13 will release, and the piston will continue to translate requiring the reversible pump to expend sufficient energy necessary to pump liquid into the rod side leg of the circuit against the pressure set by pressure relief valve 11 rather than at reservoir pressure.

Similar excess liquid volume problems are encountered when a direct drive, reversible hydraulic gear-type power source is incorporated into a combination of drive coupled, anal hydraulic reversible hydraulic motors with mechanically coupled drives for driving winding systems translating a structure such as a swimming pool cover back and forth across a swimming pool. In such winding systems the rotational rate of the driving motor is constant while rotation rate of the driven motor (functioning as a pump) varies. For example, in the pool cover systems described in the Applicant's prior patents (supra) when the cover is being driven for winding the around the cover drum it rotates at a constant rate, but the rate at a which cover winds increases or accelerates as the circumference of the drum and wound up cover increases. This acceleration in cover winding rate, in combination with the acceleration caused by the decrease in circumference of the unwinding cable reel(s) continuously accelerates the rotational rate of the driven (pumping) motor.

In such winding systems, initially the liquid volume output from the driving motor typically exceeds the input volume requirements of the driven (pumping) motor, which if not alleviated causes the driven motor to rotate at a faster rate possibly overdriving, and unwinding of the component coupled to its drive shaft allowing slack to develop between the translating mechanical components coupling to the respective mechanical drive shafts of the coupled hydraulic motors. In U.S. Pat. No. 5,546,751, the Applicant utilizes an anti-cavitation manifold to direct such excess liquid to the return hydraulic line for the reversible source of hydraulic power. [See Col 8 lines 35–55.] Then at the point, where the pump demand of the driven motor equals then exceeds that of the output from the driving motor i.e., the point where its liquid output is not sufficient to supply input demanded by the driven (pumping) motor, the anti-cavitation manifold couples the output from the driven motor to its input to prevent cavitation. [See Col 8 lines 55–62.]

The Applicant recognizes in U.S. Pat. No. 5,546,751 [Col. 9, ll. 20–41] that the invented anti-cavitation manifold in static circumstances, does not prevent the drive shaft of the last driving motor from rotating in the driving direction responsive to excess volume in the particular hydraulic supply line from the reversible hydraulic power source, e.g. liquid pushed out from the hydraulic lines connecting to the pressure relief valve monitoring and preventing over pressurization in the liquid volume input leg of the hydraulic circuit. An external force can also cause over rotation of the particular driving motor moving the translating components coupling between the respective mechanical drives of the dual reversible hydraulic motors to an undesired position particularly since, in static circumstances the anti-cavitation manifold allows drive shaft of the last driven (pumping) motor to rotate in either the 'driving' or 'pumping' direction responsive to an external force.

A prior art solution to the incremental excess volume problem in hydraulic circuits driven by direct drive reversible power describes a shuttle or control spool valve shuttling in a passageway in module, responsive to hydraulic volume increases and decreases in hydraulic liquid volume in the respective legs of the circuit, functionally similar to the duel shuttle ball-shuttle rod and translation passage combination of Applicant's anti-cavitation manifold (U.S. Pat. No. 5,546,751 Col. 2, l. 63–Col. 4, l. 21). The translating shuttle or spool of the valve functionally isolates the high pressure leg of hydraulic from the low pressure leg and redirects all liquid flow from the low pressure leg of the hydraulic circuit directly to the reservoir bypassing the particular check valve 8 or 9 maintaining the system liquid full. [See Oildyne Brochure]

The disadvantages of the Oildyne shuttle cock or spool value, relate to the fact that the entire flow in the particular discharge leg of circuit is directed into reservoir requiring the direct drive, reversible motor to make up or pump hydraulic all liquid requirements for driving the circuit from the reservoir via check valves 8 or 9 which must be present for proper functioning of any involved hydraulic circuit.

SUMMARY OF THE INVENTION

The invented dual, coupled check valve mechanism for a direct drive, reversible hydraulic power source for hydraulic circuits includes a manifold hydraulically coupled to the respective input/output ports and a reservoir of the hydraulic power source defining a translation passageway having mid-passage drain hydraulically coupled to the reservoir, where each end of the translation passageway has an angled annular valve seat opening to larger diameter plenum containing a check valve ball. A translating rod with a length greater and a circumferential diameter less than that of the translation passageway located in the translation passageway prevents the respective check valve balls from simultaneously seating on the valve seats at the respective ends of the translation passage way.

In operation, liquid volume pumped from one or the other ports of the reversible direct drive power source power seats the check valve ball in the plenum on the volume input leg of the hydraulic circuit against the valve seat at the base of the manifold plenum on the input side, translating the translating rod in the translation passageway preventing the check valve ball in the plenum on the volume output leg of the circuit from seating on the valve seat: (i) allowing the direct drive, reversible power source to pump or make up from both the output leg of the circuit and the reservoir and (ii) allowing excess liquid in the low pressure leg of the circuit to flow to reservoir without tripping any pressure relief valve monitoring liquid pressure in the output leg of the circuit.

A particular advantage of the invented dual, coupled check valve is that necessity of check vales 8 & 9 of conventional prior art hydraulic circuits for direct drive, reversible hydraulic power source for maintaining a liquid full system such as that shown in FIG. 2 and the Oildyne Manual are eliminated.

A particular aspect of the invented dual, coupled check valve mechanism is that the circumferential cross section configuration of the translating rod is not necessarily circular but rather may be rectangular, or a helical annulus with a very high spring constant or other shape that tends to minimizes liquid flow resistance of the hydraulic liquid flowing in the volume region around the translating rod in the translation passage to the mid-passageway drain to the reservoir.

Another novel feature of the invented dual, coupled check valve is that a combination of a single pressure relief valve/pressure (interrupt) switch hydraulically coupled to a plenum of a common pressure shuttle valve, respectively coupled hydraulically between the plenums at each end of the translation passageway of the manifold can protect the involved hydraulic circuit from over/under pressurization.

DESCRIPTION OF PREFERRED AND EXEMPLARY EMBODIMENTS

Figure 3:
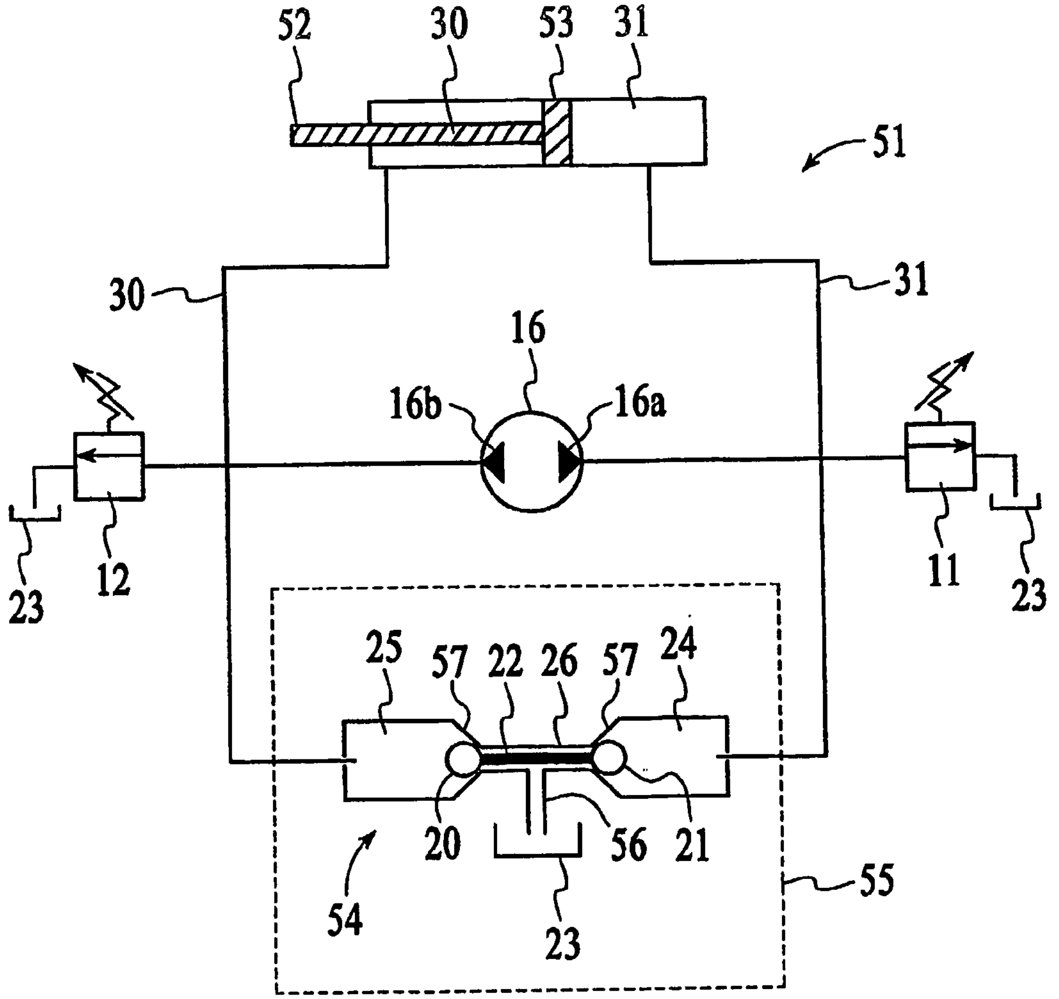
FIG. 3 is a schematic illustrating a hydraulic circuit that incorporates a direct drive, reversible hydraulic pump for extending and retracting a typical hydraulic cylinder with the invented dual, coupled check valve.

Referring to FIG. 3, the schematic illustrates a hydraulic circuit 51 that incorporates a direct drive, reversible hydraulic pump 16 supplying power for extending and retracting a typical hydraulic rod 52 extending from a piston 53 within a hydraulic cylinder HC in combination with the invented dual, coupled check valve indicated generally at 54 hydraulically coupled to the reservoir 23 for the hydraulic circuit 11. As illustrated the hydraulic circuit includes pressure relief valves 11 & 12 monitoring and relieving over-pressurization (excess volume) in both the rod leg 30 and blind side leg 31 of the hydraulic circuit 51.

Figure 1:
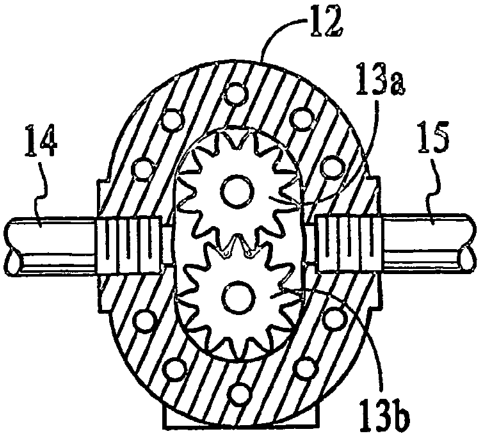
FIG. 1 is a representational schematic of a cross section of a prior art reversible direct drive hydraulic gear-type pump.
Figure 2:
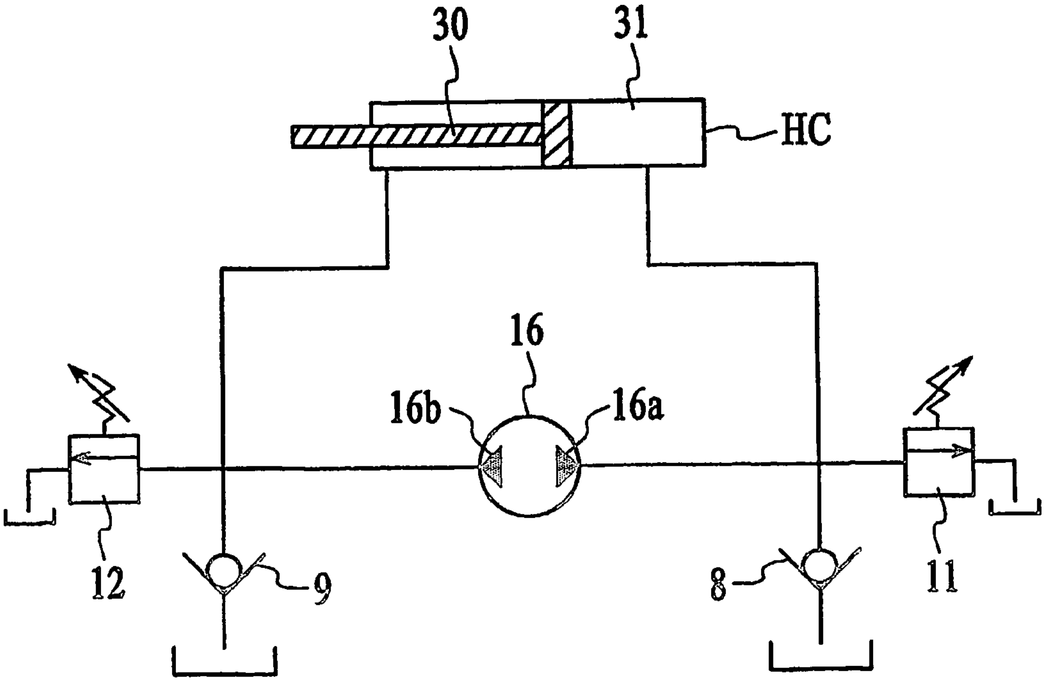
FIG. 2 is a schematic of a conventional hydraulic circuit that incorporates a reversible drive hydraulic pump for extending and retracting a typical hydraulic cylinder.

Comparing the prior art circuit (FIG. 2), the skilled hydraulic circuit designer will note the that check valves 8 & 9 shown in the prior art circuit have been replaced with the invented dual, coupled check valve 54 which includes a manifold indicated by dashed line 55 defining a translation passageway 26 having a mid-passage drain 56 hydraulically communicating with the hydraulic reservoir 23, where each end of the translation passageway has an angled annular valve seat 57 opening to a larger diameter plenum 24 & 25, each plenum containing a check valve ball 21 and 20 respectively. A translating rod 22 has a length greater and a circumference less than that of the translation passageway 26 is located and translatable in the translation passageway 12 for preventing the respective check valve balls 20 & 21 from simultaneously seating on the valve seats 57 at the respective ends of the translation passageway 26 the translating rod 22 translates in the translation passageway 26 responsive to hydraulic liquid pumped into one of the legs of and setting the input leg of the hydraulic circuit. As shown in FIG. 3, the rod side leg 30 of the hydraulic circuit as indicated by arrow A is the volume input leg of the circuit.

More exactly, check valve ball 20 moves seating on the valve seat 55 at the base of plenum 25 responsive to liquid input pumped from port 16*b* of the direct drive, reversible pump 16, translating rod 22 into plenum 24 preventing check valve ball 21 from seating on the valve seat 57 at the base of plenum 24. The blind side leg 31 is the volume output leg of the circuit of the hydraulic circuit 51 (FIG. 3) and is hydraulically coupled via the mid-passageway drain 56 to the reservoir 23. Also, the direct drive, reversible pump 16 may pump/receive input hydraulic liquid from the discharge flow in the blind side leg 31 (discharge leg) of the hydraulic circuit and if not sufficient from the reservoir 23. More significantly, the incremental excess in volume output ΔV into the blind side leg 31 (because the volume per unit length of the rod side leg 30 is less than the volume per unit cylinder length of the blind side leg 31) is free to flow to reservoir 23 via plenum 22 passageway 26 and mid passage drain 56.

In the hydraulic circuit shown in FIG. 3, reversing flow from the pump 16, the volume input leg of the circuit 51 is the blind side leg 31. Check valve ball 21 seats on the valve seat 55 at the base of plenum 24, translating the rod 22 in the translation passageway 26 unseating check valve ball 20 at the base of plenum 25. Since pumping a unit volume V of liquid into the blind side leg 31 of the circuit 51 results in a discharge on the rod side leg 30 (the volume output leg) of the circuit of V minus increment volume ΔV because of the difference in the respective volumes per unit length on the rod and blind sides of the hydraulic cylinder. Accordingly, discharge in the volume output leg of the hydraulic circuit is not sufficient to satisfy the demand of direct drive, reversible pump, pumping unit volume V of liquid into the blind side 31 of the hydraulic circuit. This insufficiency in volume ΔV is made up or pumped from the reservoir via the mid-passageway drain 56, the translation passage way 26 and plenum 25.

Figure 4:
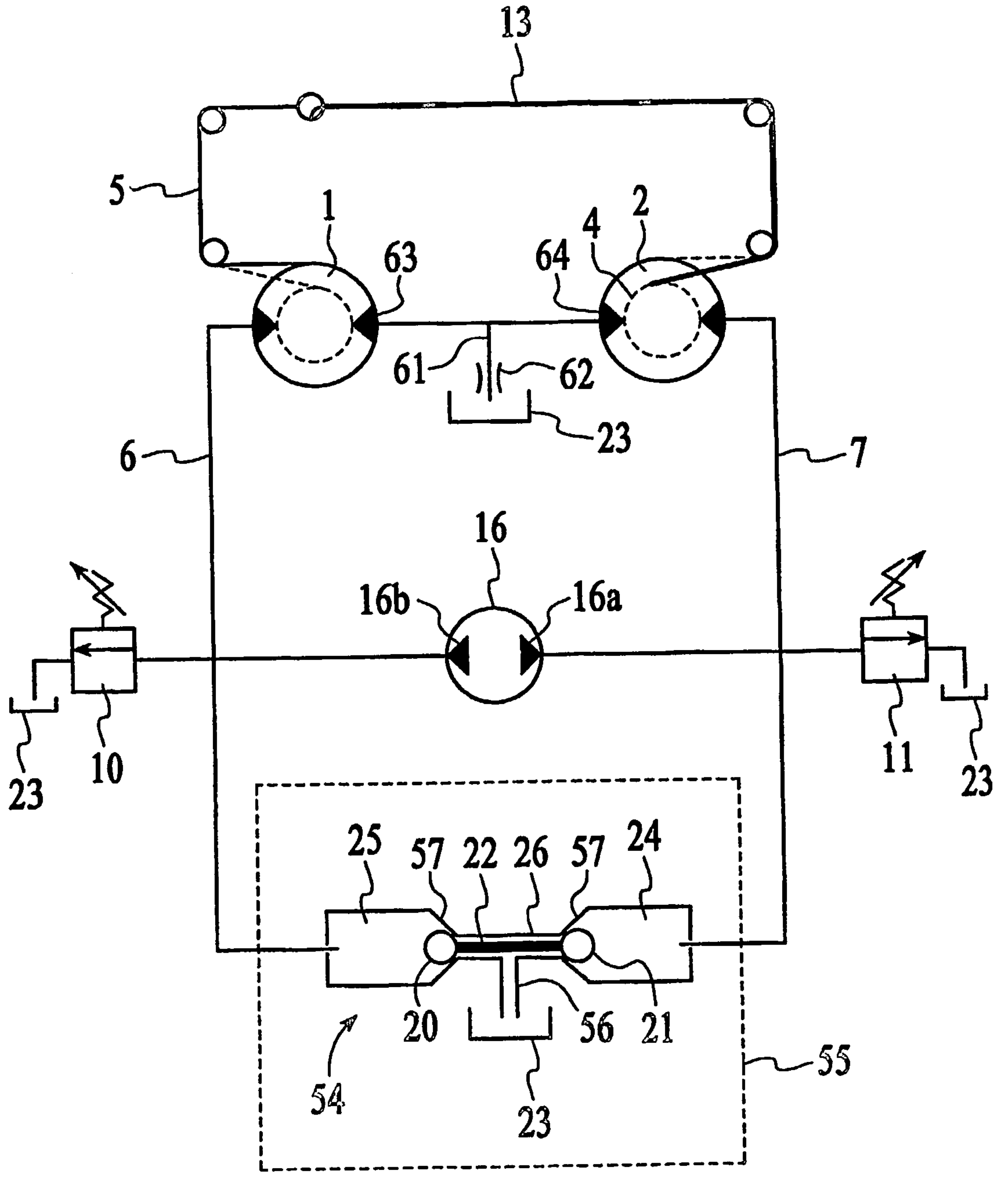
FIG. 4 is a schematic illustrating a coupled dual hydraulic reversible hydraulic motors with mechanically coupled drives for driving a winding system for translating a structure such as a swimming pool cover back and forth across a swimming pool in combination with a direct drive, reversible hydraulic power source with the invented dual, coupled check valve.

Turning now to FIG. 4, the hydraulic circuit being powered by the direct drive, reversible pump 16 that includes a combination of drive coupled, dual hydraulic reversible hydraulic motors where drives are mechanically coupled driving for driving a winding system translating a structure such as a swimming pool cover 13 back and forth across a swimming pool (not shown). As illustrated, the direct drive, reversible motor 16 pumps liquid at a constant rate into the liquid volume input leg 7 of the hydraulic circuit for winding the cover 3 around the cover drum 4 seating check valve ball 21 in manifold 55 on the valve seat 57 at the base of plenum 24, and unseating check valve ball 20 from its valve seat 57 at the base of plenum 25. As explained supra with respect to Applicant's U.S. Pat. Nos. 5,184,357, 5,327,590 and 5,546,751, initially the volume input flow exceeds the pumping demand for liquid of the driven reversible hydraulic motor 1. The excess flow drains to reservoir via drain line 61 between hydraulically coupled input/output ports 63 & 64 respectively o reversible hydraulic motors 1 & 2 As the rotation of driven reversible hydraulic motor 1 accelerates as explained above to a point where volume input demand of the pumping driven hydraulic motor exceeds the discharge liquid volume from driving reversible motor 2, the driven reversible motor 1 pumps from reservoir 23 via drain line 61, and excess output flow is available to the direct drive, reversible pump 16 but predominantly flows to reservoir via plenum 25, between the rod an 22 and translation passageway 26 and the drain line 56 to reservoir 23. Accordingly, the volume output leg 6 of the hydraulic is coupled hydraulically via the reservoir to input/output port 63 of the driven reversible hydraulic motor 1. Drain line 61 may include a flow restriction element 62 for preferentially directing output liquid discharge from inlet/outlet port 64 of reversible drive motor 2 to the inlet/outlet port 61 of reversible motor 1 and visa versa when circulation is reversed. A suitable flow restriction element would be pressure relief value in parallel with a check valve allowing flow into an slightly restricting flow out of the line connecting respective input/out ports 63 & 64 of reversible motors 1 & 2.

Figure 5:
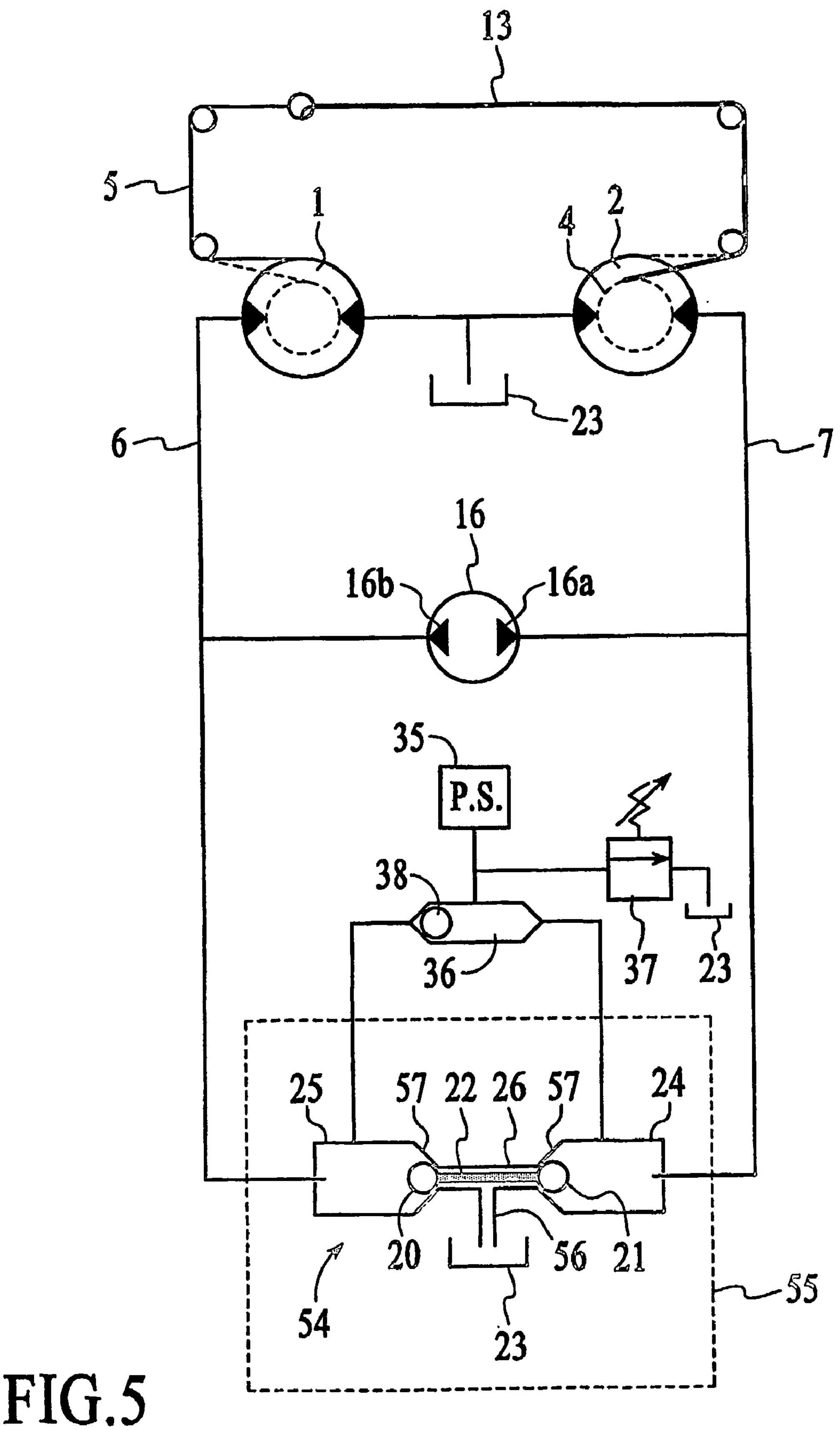
FIG. 5 is a schematic illustrating the system shown in FIG. 4 with the added the combination of a single pressure relief valve/pressure (interrupt) switch and common pressure shuttle valve for protecting the involved hydraulic circuit from over/under pressurization.

FIG. 5 illustrates the hydraulic circuit being powered by the direct drive, reversible pump 16 powering drive coupled, dual hydraulic reversible hydraulic motors shown in FIG. 4 that includes a combination of a single pressure relief valve 37 and a pressure (interrupt) switch 35 hydraulically coupled to a common plenum 36*a* of a typical shuttle valve 36 containing a single check valve ball 38. Each end of the common plenum 36*a* of the shuttle valve 36 is coupled hydraulically between one of the plenums 24 & 25 the plenums at each end of the translation passageway 22 of the manifold 55 of the invented dual, coupled check valve indicated generally at 54. Adding the shuttle value 36 to the combination directs higher hydraulic liquid volume in the respective volume output and volume input legs 6 & 7 of the involved hydraulic circuit to the pressure switch 35 and pressure relief valve 37, thus eliminating the necessity for separate pressure relief valves on the respective volume output and volume input legs 6 & 7. The skill hydraulic designer is reminded that in the particular hydraulic circuit of drive coupled, dual hydraulic reversible hydraulic motors for reversible winding systems the higher volume leg of the hydraulic circuit switch can switch to the volume output leg of the hydraulic circuit.

The invented dual, coupled check valve mechanism for a reversible direct drive, hydraulic power source has been in context of: (i) a conventional hydraulic circuit for a hydraulic cylinder extending and retracting a rod attached to a piston moving reciprocating within the cylinder responsive hydraulic liquid input from the involved circuit powered by the direct drive, reversible hydraulic power source; and a hydraulic circuit powered by a direct drive, reversible pump that includes a combination of drive coupled, dual hydraulic reversible hydraulic motors where the drives are mechanically coupled for driving a winding system translating a structure such as a swimming pool cover back and forth across a swimming pool, It should be recognized that engineers and designers that design and build hydraulic which included a plurality of hydraulic components having bidirectional directional elements of the kind or equivalent to those described herein, i.e., systems that perform substantially the same function, in substantially the same way to achieve substantially the same result as those components described and the invented system are within the scope of the invention herein as described and specified in the appended claims.

The invention claimed is:

1. A hydraulic circuit powered by a direct drive, reversible hydraulic power source having a hydraulic liquid reservoir, and two input/output ports for introducing pumped hydraulic liquid into a volume input leg and for pumping hydraulic liquid from a volume output leg of the hydraulic circuit, the volume input and output legs of the hydraulic circuit being determined by the direction of hydraulic liquid flow in the hydraulic circuit, comprising, a) a combination of drive coupled, driven and driving, dual, reversible hydraulic motors having a common hydraulic input/output plenum hydraulically communicating with the reservoir, mechanically coupled for driving a winding/unwinding system translating a structure, the driven and driving, dual, reversible hydraulic motors being hydraulically coupled between the respective liquid volume input and output legs of the hydraulic circuit, the driving reversible hydraulic motor receiving input liquid from the volume input leg of the hydraulic circuit, outputting liquid to the common hydraulic input/output plenum, the driven reversible hydraulic motor receiving and pumping liquid from the common hydraulic input/output plenum, outputting liquid into the volume output leg of the hydraulic circuit, whereby initial excess discharge liquid volume output from the driving reversible hydraulic motor into the common hydraulic input/output plenum exceeding liquid volume input pumping demand of the driven reversible hydraulic motor flows to the reservoir, and as rotation of the driven, reversible hydraulic motor accelerates to a point where its liquid volume input pumping demand exceeds the discharge liquid volume output from the driving reversible hydraulic motor additional liquid make up volume is hydraulically drawn from the reservoir, in combination with, b) a dual, coupled check valve having:

a manifold hydraulically coupled between the liquid volume input leg and liquid volume output leg of the hydraulic circuit defining a translation passageway having a mid-passage drain hydraulically coupled to the reservoir, where each end of the translation passageway has an angled annular valve seat opening to a larger diameter plenum, a check valve ball located within each large plenum at each end of the translation passageway, and a translating rod having a length greater and a circumferential diameter less than that of the translation passageway located in the translation passageway for preventing the respective check valve balls from simultaneously seating on the valve seats at the respective ends of the translation passageway, whereby, hydraulic liquid pumped from the direct drive, reversible hydraulic power source seats the check valve ball on the particular valve seat at the end of the translation passageway in the plenum on the volume input leg of the hydraulic circuit and translates the translating rod in the translation passageway preventing the check valve ball in the plenum on the volume output leg of the circuit from seating on the valve seat at the other end of the translation passageway, allowing hydraulic liquid input to the direct drive, reversible power source from both the volume output leg of the hydraulic circuit and the reservoir, and allowing excess liquid in the volume output leg of the circuit to flow to reservoir.

2. The hydraulic circuit of claim 1 and further including, (i) a shuttle valve containing a single check valve ball within a common plenum having a valve seat at each of its respective ends where each end of the common plenum is coupled hydraulically between one of the plenums at each end of the translation passageway of the manifold of the dual, coupled check valve, (ii) a single pressure relief valve and a pressure (interrupt) switch each hydraulically coupled to a common plenum the shuttle valve for protecting against over pressurization and under pressurization in the respective volume input and volume output legs of the hydraulic circuit.

3. The hydraulic circuit of claims 2 or 1 wherein the structure translated by the winding system is a swimming pool cover translated back and forth across a swimming pool.

* * * * *